United States Patent Office 3,697,371
Patented Oct. 10, 1972

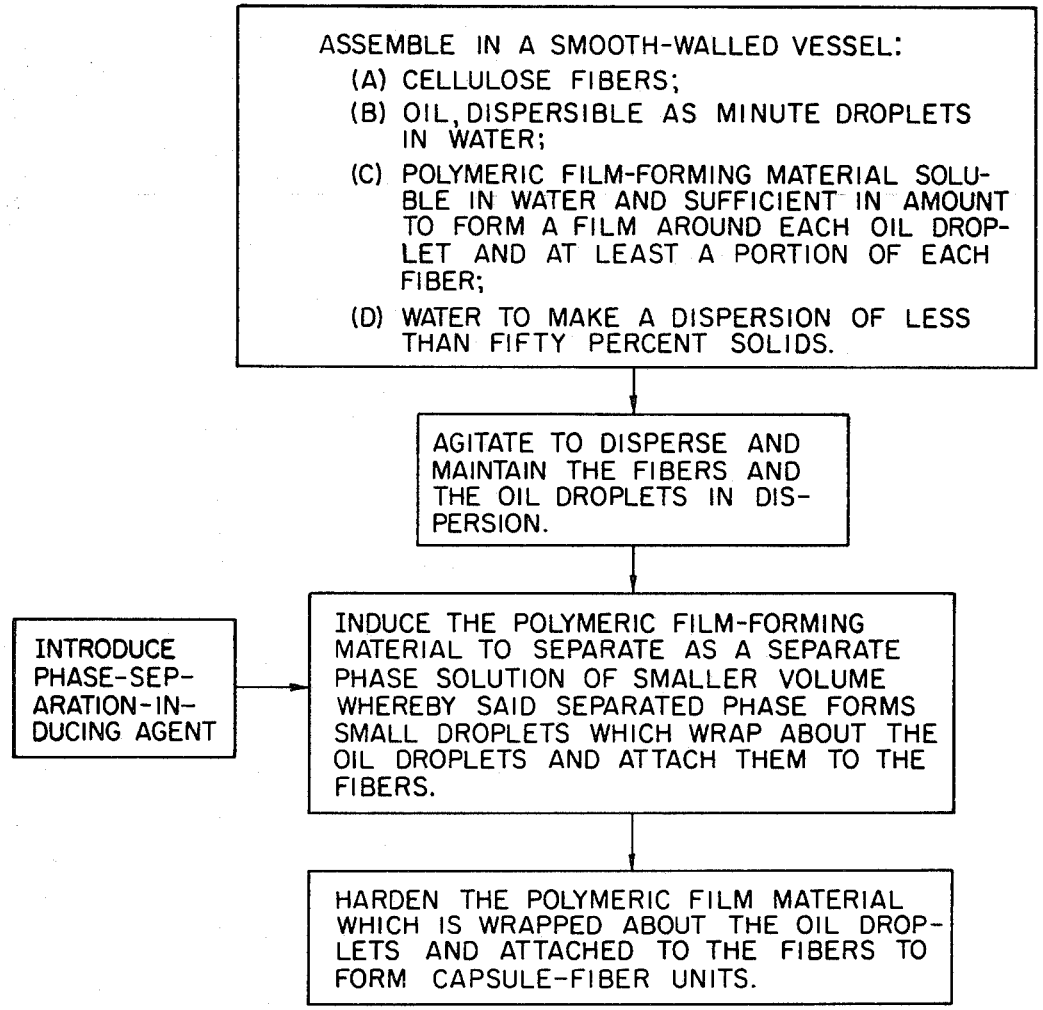

3,697,371
CAPSULE-FIBER UNIT MANUFACTURE
Lowell Schleicher, Xenia, and Robert E. Miller and Erland C. Porter, Jr., Dayton, Ohio, assignors to The National Cash Register Company, Dayton, Ohio
Filed Feb. 12, 1971, Ser. No. 114,929
Int. Cl. D21d 3/00
U.S. Cl. 162—183
10 Claims

ABSTRACT OF THE DISCLOSURE

A process of manufacture of minute capsule-fiber units, en masse, comprising the steps of (1) dispersing cellulose fibers and oil material as droplets in an aqueous solution of a film-forming polymeric material, (2) changing the conditions of the solution to make the polymeric material less soluble so as to give an emergent coacervate phase of polymeric material which wraps the oil droplets and attaches them to the fibers to give capsule-fiber units and (3) hardening the polymeric material of the capsule-fiber units.

---

The invention relates broadly to microcapsule-fiber units made by attaching minute oil droplets to cellulose fibers, individually, by an en masse process in which the droplets, of relatively minute size, are wrapped and attached to cellulose fibers, in an aqueous medium, by means of a dispersed phase of film-forming polymeric material liquid solution, and to processes employing such units and products made therewith.

The units are sturdy enough to be recovered from the manufacturing medium and used in redispersion, if required, or used in the initial manufacturing vehicle with adjustment of the residual aqueous phase as to content.

The invention provides material means and a way to make a paper sheet having a stratum of the capsule-fiber units, the capsules containing and yielding on rupture a material of significant utility, such as a colored material, a chromogenic material, an odorous material, a medicinal material, and the like, for use in situ in the sheet where released or for transfer to another surface. In paper sheet making, the capsule-fiber units may be sufficiently large to be retained on the surface of a wet embryo base sheet of paper fibers, there to form a stratum which is bonded fiber-to-fiber with the base sheet.

The capsules in a manufacturing batch may be alike or different as to size, construction, and content, to give a great adaptability of the invention in combining the attributes of different capsules in individual capsule-fiber units.

Capsule-fiber units of different batches can be blended together to obtain a composite product.

The preferred use of the capsule-fiber units is in the making of paper, to be specified, but the units may be used in a coating or extruding composition to make other than fibrous sheet material. For instance, they may be incorporated in or with textiles and yarns, incorporated in or coated on film material by coating or extrusion, or dried as units and used for any purpose where the joint attributes of fibers and capsules are desired to be integrated together. The units will undergo severe forces in agitation in a liquid without capsule failure or breaking off of the capsules from the fibers.

Individual fibers which may be in a manufacturing batch may be in lesser or greater amounts by weight with respect to the droplets, and therefore the capsule-fiber units of different batches may differ as to relative numbers of droplets held on the participating fibers. The relative amounts of materials used in a batch may be adjusted accordingly.

CROSS-REFERENCE TO RELATED APPLICATION

This invention is related to U.S. Pat. No. 3,384,536, which issued May 21, 1968 on application of Robert W. Sandberg, Bruce W. Brockett, and Donald B. Clark and to U.S. patent application Ser. No. 653,755, filed July 17, 1967 by Isidore L. Yurkowitz, now Pat. No. 3,565,753.

In the Sandberg et al. process, pre-formed capsules are bonded to cellulose paper fibers when the capsules are brought into contact with a moving web of fibers on a paper-making machine, and no separate capsule-fiber units are formed in that disclosure.

In the Yurkowitz process, pre-formed capsules are bonded to cellulose fibers to make capsule-fiber units rather than the simultaneous process disclosed in the instant application where liquid oil droplets are wrapped with polymeric film material and bonded with the same material to cellulose fibers in a single encapsulation step.

BRIEF SUMMARY OF THE INVENTION

In addition to providing capsule-fiber units, consisting of individual cellulose fibers having droplets of minute size wrapped and bonded thereto with polymeric material, by a new method, this invention relates to making paper and paper products, as the preferred use, wherein the product has the capsule-fiber units built into the product in accurately supplied numbers and placement in the sheet is selectively controlled. The capsule-fiber units are applied to a wet embryo paper sheet in a hand sheet mold or to a wet embryo paper sheet in transit in a continuous sheet paper machine after draining to a set condition, but before pressing, so that the fiber of the capsule-fiber units, as far as possible, mingle at the wet surface of the base sheet and form a true stratum of the sheet.

After selectively predetermining how thick a stratum of the capsule-fiber units should be built into the final sheet, a division of the total fiber content of the sheet is determined and a division made as to what amount shall be applied as a base ply and what shall be applied as a component of the capsule-fiber units. In a Fourdrinier paper-making machine, the base sheet fibers are furnished from the head box to form a primary non-capsule base ply, and what is the capsule-fiber unit portion should be applied down-screen from the head box as a second application of fibers bearing the capsules to form a secondary ply. As the fibers of the capsule-fiber units have the capsules clinging thereto firmly like buds if the capsules are relatively small with respect to the fibers, the units, because of their size, which is determinable, cannot penetrate into the wet base sheet to which they are applied more than just enough to be integrated at the resultant fiber-to-fiber interface. The capsules clinging to the fibers create units of such dimension that said units cannot pass into the partially-drained and -set fiber web already in position on the screen. Therefore the final sheet will have the capsule-fiber units therein only to a thickness which is proportional to the amount of fibers used plus the capsules.

The art of the invention in making the capsule-fiber units, in one practical form, is to disperse the fibers, which are to have the droplets wrapped and attached thereto, in an aqueous medium which is combined by addition with an aqueous solution of a polymeric material which has an electric charge of one polarity—for example, a cationic charge—and having therein the desired proportion of water-insoluble liquid as dispersed droplets. To attach the water-insoluble droplets to the fibers, an oppositely-charged polymeric material adapted to complex with the cationically-charged material is introduced into the stirred dispersion, which promptly results in the formation of a separate liquid phase of a polymer complex in liquid solution state, but richer in polymeric material than the original solution. This rich polymeric material solution phase in dispersion constitutes a coacervate. The droplets, if smaller than the fibers, upon the formation of a separating liquid phase of complex polymeric material, become wrapped with polymeric material and attached along the fibers as in the manner of buds or as clusters. It is thought that the amphorphous parts of the fibers are more receptive of the wrapped droplets than the crystalline areas.

The most important contribution of this invention is the achievement of microcapsule-fiber units without having to pre-form solid-walled microcapsules for attachment to the fibers. The weight ratio of wrapped oil droplets to fibers used in forming the units may vary, from about 1-to-1 to a ratio of about 50-to-1, so that more or less droplets are wrapped and bonded to the fibers. Wholly crystalline areas of the fibers seem not to hold wrapped droplets or the polymeric material solution.

This invention provides capsule-fiber units which may be put to the same uses as the capsule-fiber units of the previously cited Yurkowitz application, U.S. Ser. No. 653,755. The advantage of the instant invention is the providing of capsule-fiber units from fibers and oil droplets by a single coacervative encapsulation step. Once made, the capsule-fiber units of this invention are equivalent to the capsule-fiber units disclosed and claimed in said application, U.S. Ser. No. 653,755.

Shee materials embodying minute capsules are described in U.S. Letters Patents Nos. 2,730,456 and 2,730,457, issued Jan. 10, 1956, on application of Barrett K. Green and Lowell Schleicher. Similarly reactive sheet materials can be made by processes described by Yurkowitz (U.S. Ser. No. 653,755) using the capsule-fiber units of this invention.

It is contemplated that the attached droplets of the capsule-fiber units need not be of uniform substance and size. The droplets may be a mixture as to size and chemical composition to serve one or more utilitarian purposes in behavior. The encapsulation of diverse sizes and kinds of droplets in a single encapsulation step is taught by Bernard Katchen and Robert E. Miller in U.S. Pat. 3,041,289 which issued June 26, 1962. Furthermore, mixtures of different kinds of capsule-fiber units may be made up for incorporating in a paper web simply by making more than one kind of capsule-fiber unit and mixing them together after encapsulation is completed. The capsule-fiber units may be mixtures, so the components have walls of different resistance to rupture or fracture, and may be different in content or behavior otherwise.

By introducing oil droplets and fibers into the phase separation system, wherein polymeric materials of opposite electric charge coact in solution in a vehicle under appropriate conditions cause the generation and emergence of a relatively viscous solution of the polymeric material as a separate liquid phase which may be stirred into a discontinuous separate liquid phase, it has been found that adhesion of oil dropletes to the fibers in a liquid slurry can be effected. Thus, upon contact of polymer molecules of one charge and polymer molecules of opposite charge, a relatively viscous liquid solution phase separates, which, being capable of wetting the oil droplets and the fibers, binds the oil droplets to the fibers so wetted, and the agitation keeps the newly formed capsule-fiber entities from merging.

In general, any known technique for effecting a phase separation of a viscous liquid polymeric material phase from a continuous phase is satisfactory. Equally effective is the establishment of such a two-phase liquid system by judicious selection of materials of polymeric and solvent components. An establishment of a two-phase liquid system is disclosed in U.S. Pat. No. 3,436,355 which issued Apr. 1, 1969 on application of Joseph A. Bakan. Essentially, the manufacturing system may be characterized as comprising four mutually incompatible phases: (a) a continuous liquid vehicle; (b) a discontinuous phase of a multiplicity of oil droplets dispersed therein; (c) short, ball-milled cellulose fibers dispersed therein, and (d) a discontinuous phase of mobile entities of film-forming polymeric material dispersed therewith in the liquid vehicle, with said entities of polymeric material wrapping said oil droplets and binding them to the fibers.

In a preferred embodiment of this invention as relates to paper making, cellulose fibers ball-milled to dimensions of 20 to 50 microns are bonded to oil droplets which are simultaneously encapsulated by the novel process. Various other cellulose fibers may be employed as capsule-free plies or capsule-bearing plies; for example, as a capsule-free primary ply. Eligible capsule-bearing or non-capsule-bearing fibers that can be reduced in size include natural cellulosic fibers such as fibers yielded by hard and soft tree woods and woody plants like Manila hemp, jute, caroa, sisal, kozu, rye, wheat, oats, barley, rice, ramie, cane and corn-stalk fibers etc. The papermakers' materials unbleached sulfite pulp, semi-bleached sulfite pulp, fully bleached sulfite pulp, unbleached semi-chemical pulp, semi-bleached semi-chemical pulp, caustic cooked chestnut fiber, unbleached soda pulp, semi-bleached soda pulp, fully bleached soda pulp, unbleached and cooked cotton rag stock, bleached and cooked cotton rag stock, cooked bagasse fibers, cotton linter pulp of various types and grades, mechanical pulp from both coniferous and deciduous woods, and other bast fiber stock, old paper stock made up of any or all of any mixture of used paper-making fibers, and, in fact, any cellulosic fibrous material that lends itself to the formation of units useful in making cellulosic webs or forms webs from an aqueous suspension are eligible starting materials.

Among the synthetic fibers which may be used as auxiliary plies or which may be used to augment natural fibers in non-capsule-bearing plies are polyacrylic fibers, polyester fibers, or polyamide fibers.

Suitable mark-forming components are described in the above-mentioned U.S. Pats. Nos. 2,730,456 and 2,730,457.

The figure is a flow sheet showing the making of the fiber-capsule units: providing oil droplets and fibers in an aqueous polymer solution, inducing the polymer solution to coacervate and wrap the oil droplets and attach them to the fibers, and finally hardening the microcapsule-fiber units so-formed. The last step of hardening is an optional, separate step, depending on the polymeric wall materials chosen and the uses to which the finished microcapsule-fiber units are to be put. Some polymeric wall materials, such as aminoplasts, are sufficiently hard in and of themselves, at the time of formation, to need no additional hardening step. Gelatin may be hardened reversibly simply by cooling, or irreversibly by chemical treatment, as with glutaraldehyde, to cross-link the polymer chains.

The liquid droplets which are wrapped and attached to the fibers are herein referred to as "oil" droplets by which is meant droplets of a water-insoluble liquid.

The cellulose fibers used herein to make the capsule-fiber units may be ball-miled to give short fibers or fibril-bundles which are readily wet by the polymeric-film material phase during the wrapping and attachment of the oil droplets. Alternatively (or additionally), the fibers may be sized, as with a rosin-alum size, or pre-soaked in an alkaline bath to enhance the wettability of the fibers Sizing is the preferred method because it is simple, quick and economical.

Set out here are methods of making and using the capsule-fiber units of this invention. The method of making the capsule-fiber units taught herein is new and will be taught in detail in the examples below. All parts in the examples are parts by weight unless otherwise specified.

EXAMPLE 1

Preferred example: Sulfite paper fibers were dispersed in 450 milliliters of water to give a suspension of 0.25 percent solids with the pH adjusted to 10.5. The fibers were allowed to soak for about 2 days at this pH and then were beaten for about 5 minutes in a Waring Blendor (trademark) at slow speed. To the paper fiber dispersion was added, with continued slow-speed beating, an emulsion of internal phase oil droplets in a water solution of wall-forming polymer. The emulsion was prepared by beating 25 milliliters of an oil solution of Crystal Violet Lactone, CVL (prepared by dissolving 1.5 grams of CVL in 98.5 grams of a mixed solvent which was 2 parts of a chlorinated biphenyl (48 percent chlorine content) and 1 part of a high-boiling alkyl hydrocarbon) into 75 grams of an 11 percent aqueous solution of gum arabic, 15 grams of a 33 percent aqueous solution of polyethylenimine and 20 milliliters of water.

Coacervation of the wall-forming polymer (gum arabic-polyethylenimine) to wrap the CVL-solution droplets and attach them to the paper fibers was carried out by the dropwise addition of 14 percent aqueous acid to an end-point pH of 9.7 while stirring was continued. The mixture was then chilled in an ice-bath to 10 degrees centigrade; the pH was lowered to 6.5; 5 milliliters of 25 percent aqueous glutaraldehyde was added; and stirring was continued overnight at ambient temperature.

The resulting dispersion of capsule-fiber units was then ready for use as all or part of the fibers in the manufacture of a paper sheet.

EXAMPLE 2

Short (20–35 microns long), ball-milled, alpha-cellulose fibers were readily used in the place of sulfite paper fibers without either sizing or alkaline pre-soak.

To 700 grams of fiber dispersion (1 part of fiber to 6 parts of water) at 55 degrees centigrade was added, with stirring, 40 milliliters of internal phase oil (as in Example 1) dispersed in 182 grams of 11 percent aqueous gelatin solution, also at 55 degrees centigrade. The pH was adjusted to 9.0. To the dispersion of fibers and oil droplets in gelatin solution was added 182 grams of 11 percent gum arabic solution at pH 9.0 and 630 milliliters of water both at 55 degrees centigrade. With continued stirring, the mixture was allowed to cool slowly from 55 to 28 degrees centigrade while the pH was adjusted to 4.6 by the dropwise addition of 14 percent aqueous acetic acid. With continued stirring the mixture was then quickly chilled to 10 degrees centigrade and treated by the addition of 10 milliliters of 25 percent aqueous glutaraldehyde. After one hour, 15 milliliters of 5 percent aqueous poly(methylvinylether-maleic anhydride) copolymer was added and let stir for one hour before 5 milliliters of 20 percent aqueous sodium carbonate and enough 10 percent aqueous sodium hydroxide to adjust the pH to 10.2 were added.

What is claimed is:

1. A process of making microcapsule-cellulose fiber units comprising microcapsules attached by polymeric film-forming material to individual cellulose fibers, comprising the steps of
   (a) dispersing an amount of oil as droplets in water in which is dissolved film-forming polymeric material that can be made immiscible in the water so as to separate as a liquid phase by altering the conditions of the solution;
   (b) stirring the desired amount of the fibers into the dispersion; and
   (c) changing the conditions of the solution with stirring to cause emergence of the liquid phase as a dispersion of droplets which wrap around and bind the oil droplets to the fibers which on continued stirring form small units of fibers and capsules.

2. The process of claim 1 wherein the fibers are ball-milled alpha-cellulose fibers and the emergent liquid phase of polymeric material comprises gelatin.

3. The process of claim 1 wherein the emergent liquid phase of polymeric material comprises polyethylenimine.

4. A process for making microcapsule-fiber units comprising the steps of
   (a) providing a slurry comprising water, film-forming polymeric material dissolved in the water, cellulose fibers of a quality useful in paper-making, and oil dispersed as droplets in the water; and
   (b) changing the condition of the slurry to make the polymeric material less soluble in the water, said change in conditions being accompanied by stirring, whereby a separate liquid phase of rich polymeric material solution emerges, wraps said oil droplets, and binds individual fibers and wrapped oil droplets together to make microcapsule-fiber units.

5. The process of claim 4 in which the cellulose fibers are selected from dry ball-milled cellulose fibers of from 20 to 35 microns in length.

6. The process of claim 4 in which the polymeric material in solution comprises polyethylenimine.

7. The process of claim 4 wherein the film-forming polymeric material has a cationic charge when dissolved in the slurry.

8. The process of claim 4 wherein the polymer-rich phase emergence is brought about by the addition to the slurry of step (a) a material which has an anionic charge.

9. The process of claim 4 wherein the film-forming polymeric material has one electric charge and the change in condition of the slurry of step (a) is brought about by the addition to said slurry of a material which has an opposite electric charge.

10. A process for making units of minute size consisting of cellulose fibers having securely attached thereto, by polymeric material, one or more microcapsules, comprising the steps of
    (a) selecting relative amounts of fibers and oil in a range to form a mix of from 1 part microcapsules to 1 part fiber to 50 parts microcapsules to 1 part fiber;
    (b) by agitation, dispersing the selected oil as droplets and fibers in a water solution of film-forming polymeric material;
    (c) and, by introducing a material into the dispersion of step (b), causing the polymeric material to coacervate and emerge from a residual water phase as a separate lesser volume of solution richer in polymer and dispersible in the residual water, and continuing agitation to cause droplets of emergent coacervate to wrap said oil droplets and bind said oil droplets as microcapsules to the cellulose fibers.

References Cited

UNITED STATES PATENTS

| | | | |
|---|---|---|---|
| 3,257,267 | 6/1966 | Hay | 252—316 X |
| 3,384,536 | 5/1968 | Sandberg et al. | 162—185 X |
| 3,565,753 | 2/1971 | Yurkowitz | 162—158 X |

S. LEON BASHORE, Primary Examiner

F. FREI, Assistant Examiner

U.S. Cl. X.R.

162—158, 162, 164, 168, 179, 174; 252—316